J. BLACKBURN.
STEERING AND CONTROLLING MECHANISM FOR AUTOMOBILES.
APPLICATION FILED JAN. 27, 1919.
1,435,692.
Patented Nov. 14, 1922.
3 SHEETS—SHEET 2.
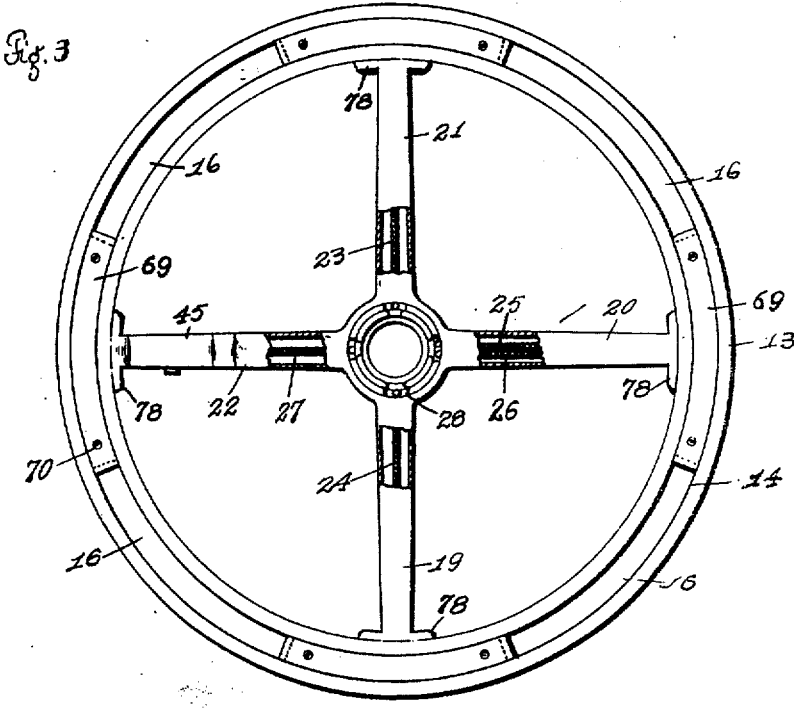
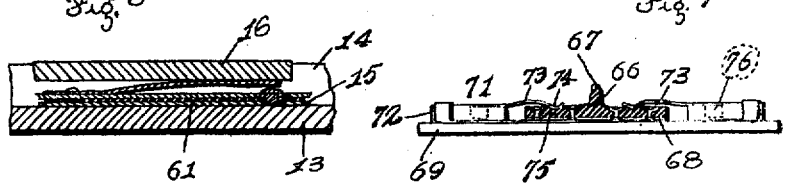
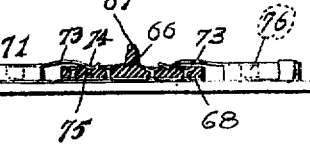
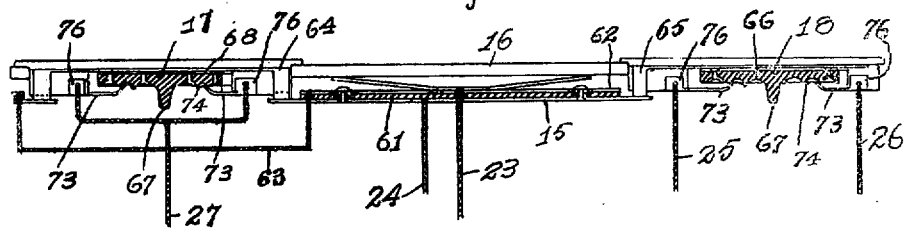
Inventor
Jasper Blackburn
by Edward E. Longan
Atty.

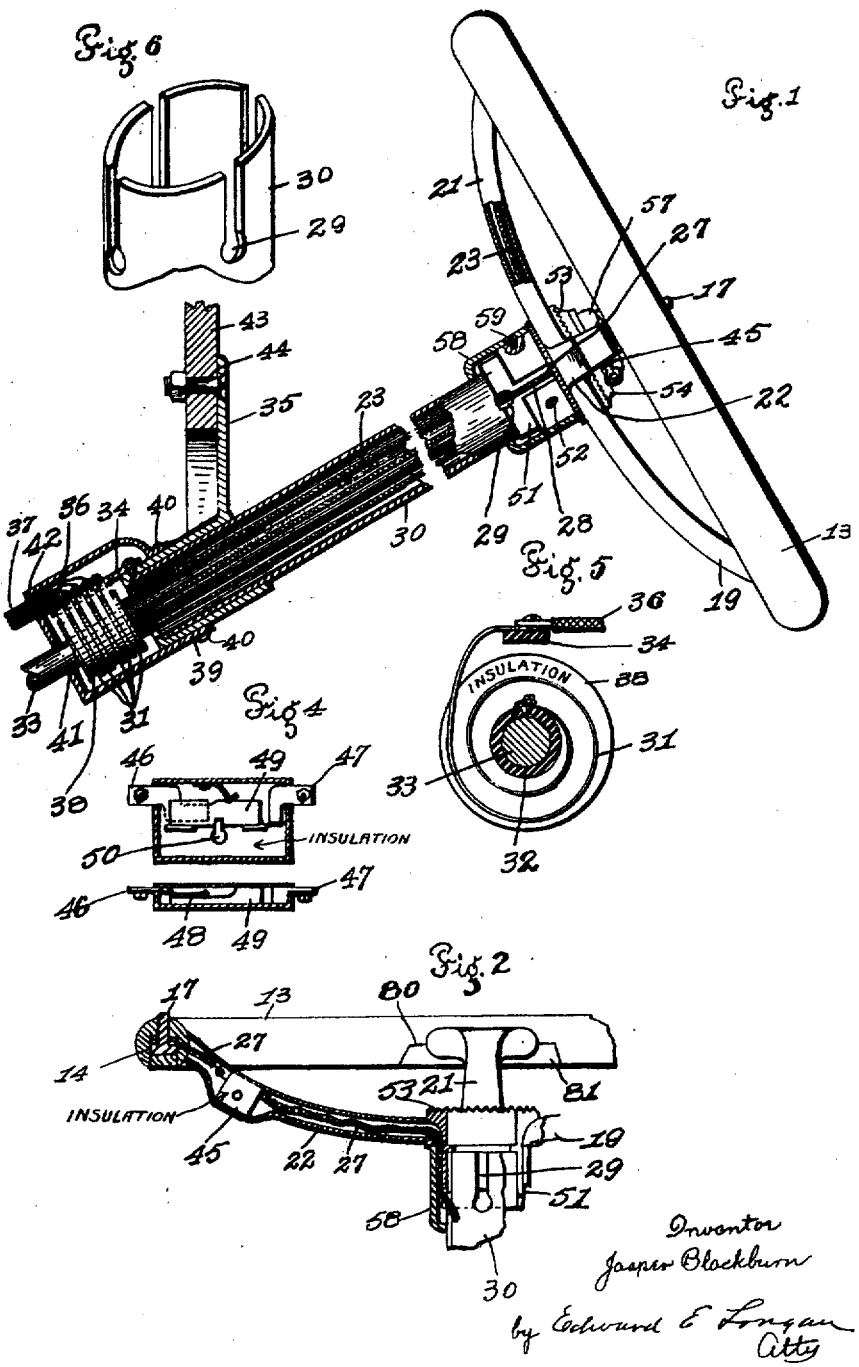

J. BLACKBURN.
STEERING AND CONTROLLING MECHANISM FOR AUTOMOBILES.
APPLICATION FILED JAN. 27, 1919.
1,435,692.
Patented Nov. 14, 1922.
3 SHEETS—SHEET 3.
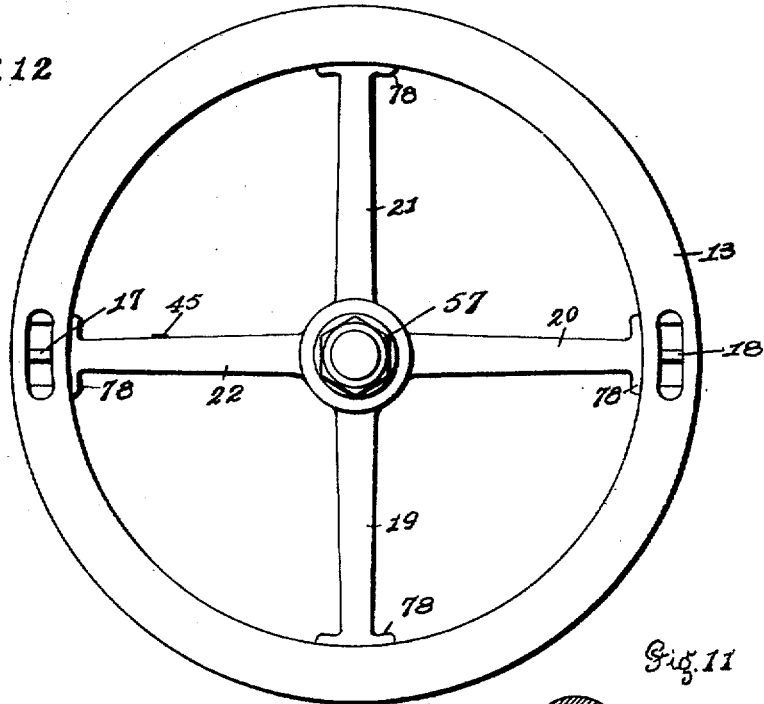
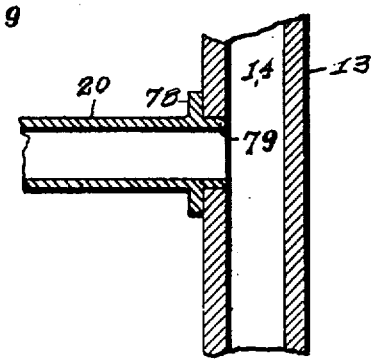
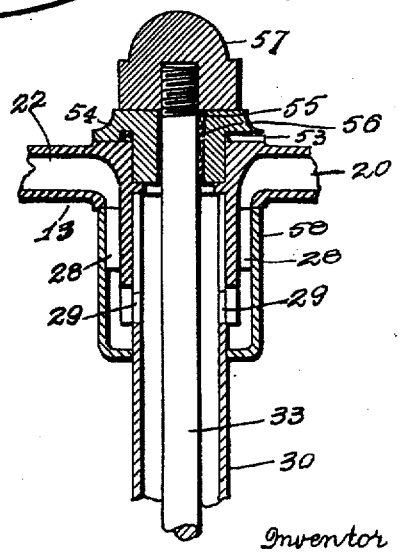
Inventor
Jasper Blackburn
by Edward E. Longan
Atty Patented Nov. 14, 1922.

1,435,692

UNITED STATES PATENT OFFICE.

JASPER BLACKBURN, OF WEBSTER GROVES, MISSOURI, ASSIGNOR TO THE BLACKBURN PATENT STEERING WHEEL COMPANY, OF ST. LOUIS, MISSOURI, A CORPORATION OF MISSOURI.

STEERING AND CONTROLLING MECHANISM FOR AUTOMOBILES.

Application filed January 27, 1919. Serial No. 273,259.

*To all whom it may concern:*

Be it known that I, JASPER BLACKBURN, a citizen of the United States and resident of Webster Groves, Saint Louis County, Missouri, have invented certain new and useful Improvements in Steering and Controlling Mechanism for Automobiles, of which the following is a specification containing a full, clear, and exact description, reference being had to the accompanying drawings, forming a part hereof.

My invention relates to certain new and useful improvements in steering and controlling mechanism for automobiles and has for its primary object the construction of a steering wheel proper wherein a series of electric contact making and breaking devices are located within the wheel rim and are concealed and protected, likewise the electrical conductors that are carried by the rim are embedded within the rim and are concealed and protected, and all the electrical conductors leading from the contact making and breaking devices are concealed and protected within the wheel spokes and the hub of the wheel and the steering column.

Another primary object of my invention is the employment of a lock switch carried by the wheel for the purpose of breaking and locking the ignition circuit.

Another object is to interpose between the conductors that lead out of the steering column, a helical spring conductor, so that no twisting of the conductors proper will take place by the operation of the steering wheel.

In the drawings:

Fig. 1 is a side elevation of a steering wheel with parts in section; also the rotating steering column, the housing or support for the steering column and a side view of the spring conductors interposed in the circuits.

Fig. 2 is a transverse section of the rim, and a longitudinal section of the wheel spoke illustrating the lock for the ignition circuit in position.

Fig. 3 is a bottom plan view of the wheel, part of the spokes being in section and also illustrating the conductors leading from the contact making and breaking devices in dotted lines.

Fig. 4 is a sectional view of the lock switch for the ignition circuit.

Fig. 5 is an enlarged detail section taken through the steering post and illustrating the spring conductor employed.

Fig. 6 is a fragmental perspective view of the top of the rotating steering column.

Fig. 7 is a side view of one of the ignition or light switches.

Fig. 8 is a fragmental sectional view of one of the signal operating devices.

Fig. 9 is a fragmental section view of a portion of the wheel rim and end of the spoke, showing the manner of attaching the spokes to the wheel rim.

Fig. 10 is a diagrammatical view showing the method in which the conductors are placed in the rim.

Fig. 11 is a cross-sectional view through the wheel hub, steering column and the adapting sleeve, the adapting sleeve being employed for the purpose of positioning the wheel on the steering column regardless of the position of the key carried by the steering post.

Fig. 12 is a top view of the steering wheel illustrating the location of the ignition and light switches.

Referring to the drawings, 13 indicates the wheel rim which is provided on its underneath surface with a channel 14 in which the various contact making and breaking devices are located and the electrical conductors leading therefrom. This channel is formed on the underneath surface of the wheel rim by any suitable means after the wheel rim is formed, being in the form of a circular channel and being in cross section preferably rectangular in form. Located in this channel is a primary conductor 15 which leads to the source of electrical energy, that is, the battery or magneto. Also located in this channel of the rim is the signal making and breaking devices 16, and also the ignition switch 17 and the light switch 18. The conductors leading from the ignition switch and light switch and the horn contact making and breaking devices are all located within this channel and lead from these devices through the hollow spokes 19, 20, 21 and 22 as illustrated in Fig. 3; the horn conductor being designated as 23, the battery or energy conductor being designated as 24, the light conductors 25 and 26 and the ignition conductor 27. These various conductors pass through the spokes down through channels 28 formed in the wheel hub and then pass through openings 29 downwardly within the rotating steering column 30, the openings 29 being of open slot formation to permit the ready insertion of the conductor wires within the rotating steering column, as well as the insertion of the upper end of the steering column into the wheel hub. After the conductors have been inserted within the rotating steering column 30, the lower ends are connected to a series of helical conductors 31 made of spring material, one end of these conductors being attached to a sleeve of insulation 32 which surrounds and is secured to the steering post 33, this construction being illustrated in Fig. 5, wherein it will be observed that one of the ends of the helical conductors 31 is securely mounted on a bar of insulating material 34 carried by the socket or support 35 for the steering column.

From the ends of the helical springs 31 a series of conductors 36 lead through a cable 37 to the various translating devices. Between the helical springs 31 are discs of insulating material 38. These discs may be formed integral with the insulating sleeve 32 or may be made separately and slipped over said insulating sleeve. These spring conductors are protected by a housing 39 secured to the rotating steering column support 35 by means of screws 40. This housing is provided with an opening 41 for the steering post and with another opening 42 for the cable 37. The steering column support 35 is secured to the instrument board 43 by means of bolts 44. If desired however, this support may be secured to the floor, in which case the socket formed in the support would necessarily have to be lengthened so as to give sufficient bearing to the rotating steering wheel column.

One of the primary objects of my invention is to lock the ignition circuit 27 by means of a lock switch carried preferably by one of the spokes. By means of this lock switch, the igintion circuit is broken and closed, that is to say, it is locked in broken position so as to prevent the unauthorized use of the car. This lock switch for the ignition circuit is illustrated in Figs. 2 and 4, and is, designated by the numeral 45. This lock switch comprises a casing which is secured within the spoke 22 and mounted in this casing are two electrical terminals or contacts 46 and 47 to which are attached the ends of the conductor 27, that is to say, the conductor 27 is cut and the lock switch interposed between the severed ends.

The terminal 46 has a spring end 48 formed thereon, thus forming a sliding contact with the bolt 49 of the lock. When the bolt 49 is thrown towards the contact or terminal 47, the electric connection will be established throughout the wire 27 and the ignition circuit unlocked. The housing of this lock is preferably constructed of material which is a non-conductor so that there will be no danger of a short circuit. In any event, the locking bolt 49, which answers as a conductor, must be insulated from the housing and wheel.

By means of a key inserted through the key opening 50, the locking bolt 49 may be operated to open and close the ignition circuit, whereby the ignition circuit may be locked open or broken to prevent the unauthorized use of a car. Any desirable form of lock may be employed capable of performing the above function.

The rotating steering column 30 mounted within the support 35 is inserted partly within the hub 51 of the wheel and is secured thereto by means of screws 52. The top portion of the hub 51 is provided with a series of teeth 53 adapted to engage with teeth on the adapter 54. The adapter 54 is provided with key-ways 55 to receive the keys 56 carried by the steering post 33 and by means of this adapter, the steering wheel 13 may be adjusted so as to bring the contact making and breaking devices to the desired position regardless of the position of the keys on the steering post.

Mounted on the top of the steering post 33 is a nut 57 for holding the adapter and wheel hub in engagement.

The steering column 30 is rotatably mounted in the support 35 and rotates simultaneously with the steering post 33, that is to say, the rotation of the wheel 13 rotates both the steering post and steering column simultaneously.

In order to conceal and protect the wires leading through the conductor channels formed in the wheel hub, I employ a housing 58 which is secured to the hub by means of a screw 59. In Fig. 7 I have shown the ignition switch and in Fig. 8 I have shown a portion of the signal contacting devices. Within the groove 14, I locate a plurality of electrical conductors which are in the form of a flat sheet of metal, this being illustrated in Fig. 10, wherein I have shown diagrammatically the several conductors together with the operating switches and their connections leading to the translating devices.

15 indicates the primary conductor which is directly connected to the battery conductor 24. Superimposed on the conductor 15 is a strip of insulating material 61 on which another conductor strip 62 is secured. The conductor 15 extends partially around the wheel or, in other words, does not make a complete circle. The conductor 62 is broken or formed in sections and these sections are connected together by a wire 63. The conductor 15 is bridged across, at the point where the ignition switch passes through the rim, by means of a conducting strip 64 and the end at the light switch is connected thereto by means of one contacting point 65 only.

The switches, both ignition and lighting are constructed as follows;—I provide a member 66 composed of insulating material which is provided with a projecting lug 67. The bottom portion of this member is provided with a sheet of conducting material 68 which contacts or slides on the conducting strip 64. The member 66 is slidably secured to a block 69 which is inserted in the rim and secured thereto by means of screws 70. The block 69 is provided with projections 71 and to this block I secure the bridging member 72 which is virtually a continuation of the strip or conducting member 15.

Secured to the projections or blocks 71 are spring contacts 73 which have their ends 74 bent so as to ride in grooves 75 formed in the member 66. The ends of the spring 73 are bent so as to overlap the side of the projection 71 as indicated by the numeral 76 and to these projections I connect the conductors leading to the translating devices, the conductor 27 being divided as shown in Fig. 10 so that a complete circuit will be formed, no matter in which position the switch is shifted other than neutral and to the projections 76 on the light switch the conductors 25 and 26 are connected so that when this switch is manipulated, the lights may be either dimmed or brightened.

The method of securing the rim to the spokes is shown in Figs. 2 and 9. Each spoke is provided with a projection 78 leaving a tongue or lug 79 extending therefrom. This lug or tongue is adapted to be seated or extend into the rim of the wheel. The method of securing the spokes or spider of the wheel to the rim as shown in Figs. 2 and 9 is as follows:—a portion of the rim is cut away leaving a dove-tailed opening as indicated by the numeral 80, the number of these openings corresponding to the number of spokes in the spider, and after the rim has been placed in position on the spider, the blocks 81 are inserted and secured to the rim by means of glue or screws, thus preventing the projection 79 from becoming detached or, in other words, securing the rim and spokes together.

By the use of my electrical connections and method of constructing the same, it is possible to assemble all of these connections and then place them within the channel formed in the wheel, thus obviating the necessity of having the workingmen use the wheel while the main electrical connections are being made.

Having fully described my invention, what I claim is:

1. In a steering wheel having circuit conductors located in its rim and one spoke, a lock switch located in said spoke for making and breaking the circuit through said conductors.

2. In combination with a steering wheel having circuit conductors located in its rim and one spoke, an enlargement formed in one spoke, and a lock switch located in said enlargement for making and breaking the circuit through said conductors.

3. In combination with a steering wheel having circuit conductors located in its rim and one spoke, a key operated lock switch located in said spoke, whereby said switch can be locked in open and closed position.

4. In combination with a steering wheel having circuit conductors located in its rim and one spoke, an enlargement formed in said spoke, a key operated lock switch located in said enlargement, whereby said circuit can be locked when opened and closed.

In testimony whereof, I have signed my name to this specification, in presence of two subscribing witnesses.

JASPER BLACKBURN.

Witnesses:
 FRANCES BLACKBURN,
 EDWARD E. LONGAN.